United States Patent [19]

Rhodes et al.

[11] 3,712,319
[45] Jan. 23, 1973

[54] RELEASE VALVE FOR A COMPRESSED GAS CONTAINER

[75] Inventors: Alex Rhodes, Detroit; Allen C. Wright, Dearborn Heights, both of Mich.

[73] Assignee: Ford Motor Company, Dearborn, Mich.

[22] Filed: Oct. 20, 1971

[21] Appl. No.: 190,851

[52] U.S. Cl. ........................137/68, 222/5, 251/113
[51] Int. Cl. ............................B67b 7/24, F16k 13/04
[58] Field of Search .................................222/5, 83; 137/68–71; 220/89 A, 47; 251/113

[56] References Cited

UNITED STATES PATENTS

| 2,417,374 | 3/1947 | Morton | 220/89 A X |
| 2,073,670 | 3/1937 | Allen | 222/5 |
| 2,073,688 | 3/1937 | Freygang | 222/5 X |
| 2,778,434 | 1/1957 | Hastert et al. | 169/31 |
| 3,145,573 | 8/1964 | Hebenstreit | 222/5 X |

*Primary Examiner*—Martin P. Schwadron
*Assistant Examiner*—Richard Gerard
*Attorney*—Keith L. Zerschling et al.

[57] ABSTRACT

A release valve for a compressed gas container in which the gas is sealed in the container by a frangible closure. The release valve houses a lever adapted to impact and perforate the frangible closure to release the compressed gas. The perforating lever is coupled to an actuating lever which in turn is coupled, for example, to a structural member of a vehicle. Upon deformation of the structural member, as upon a collision impact, the force is transmitted to the perforating lever to cause the latter to puncture the frangible closure. The released gas may be used to inflate the passenger restraint device, such as an air bag.

7 Claims, 3 Drawing Figures

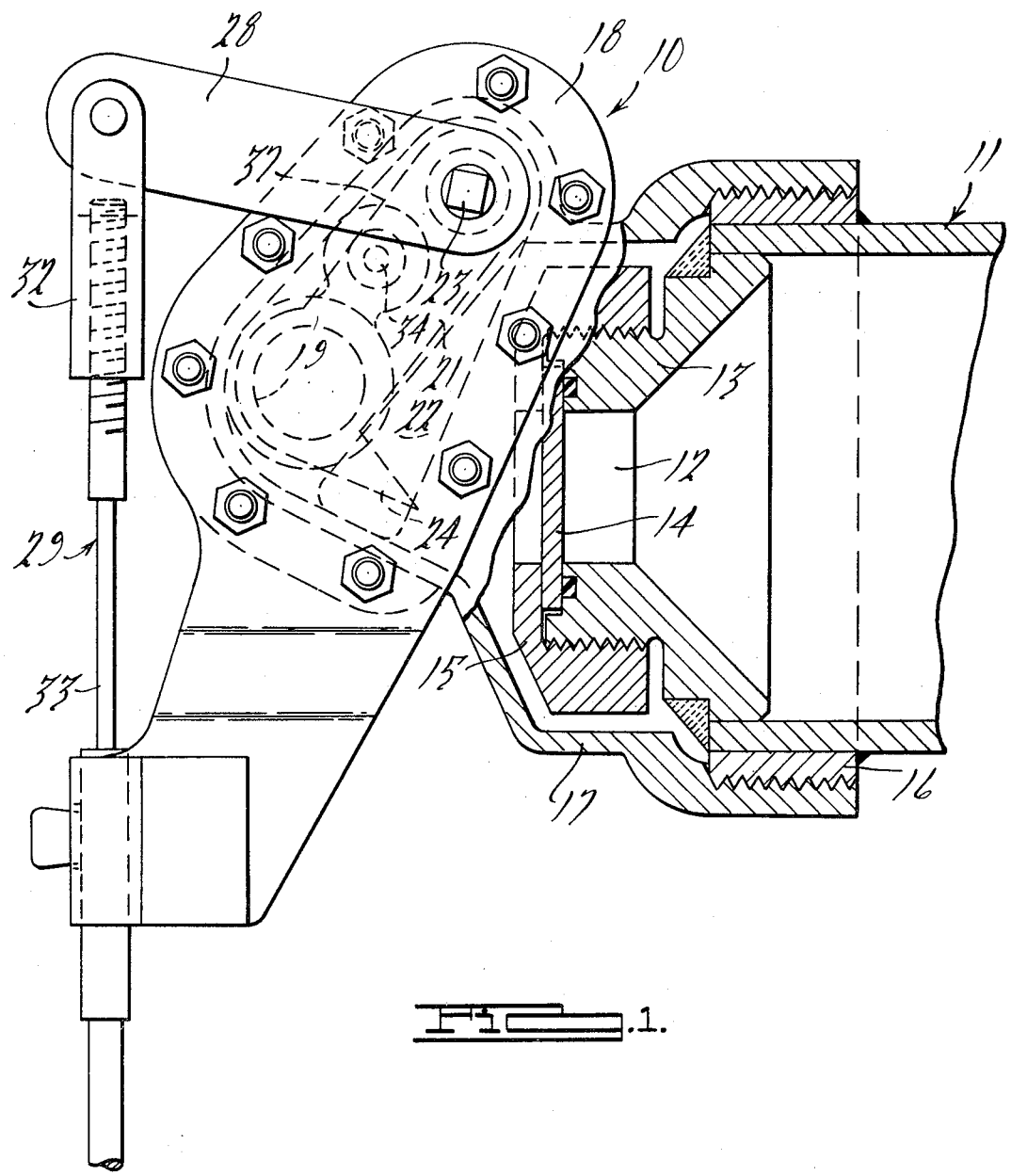

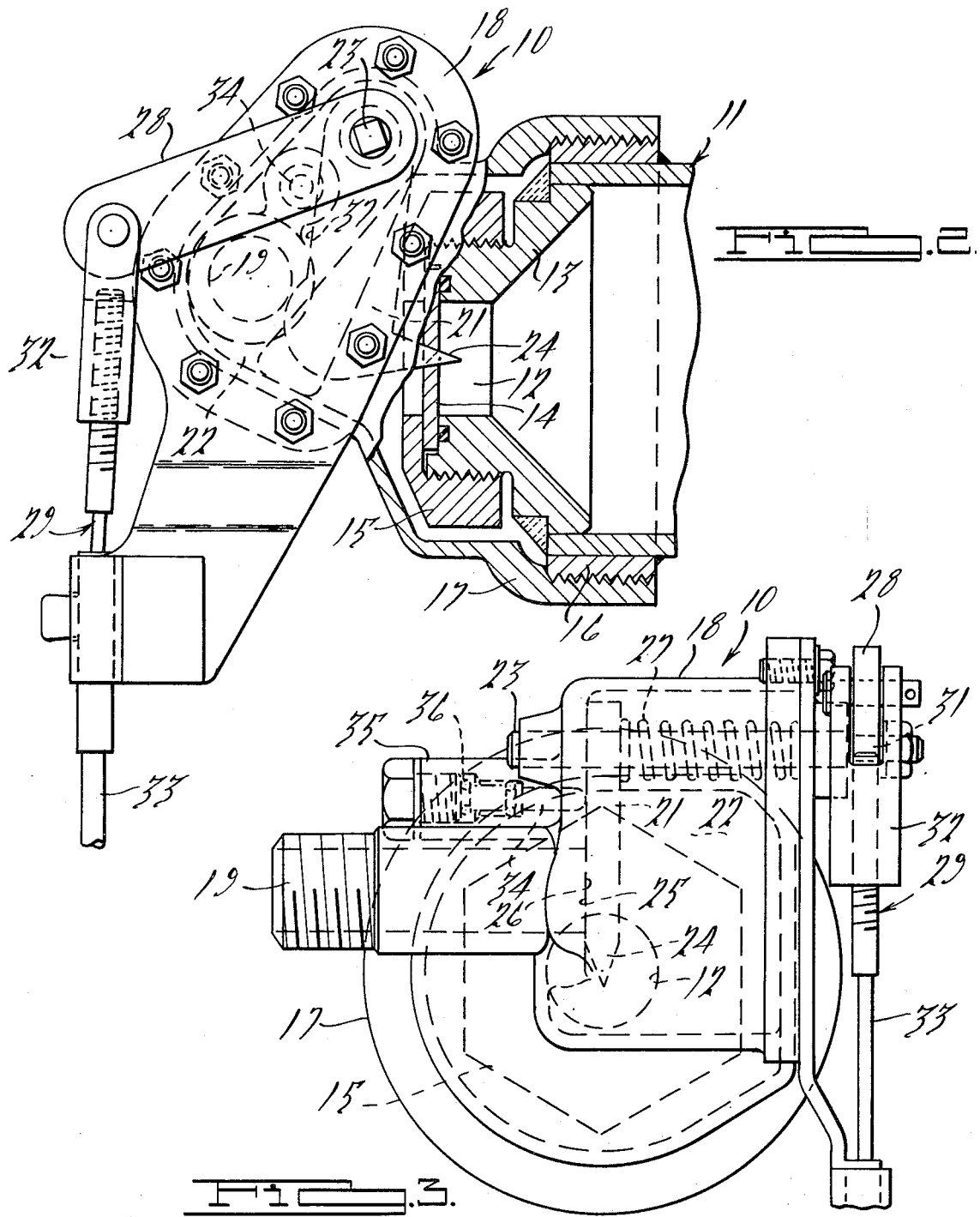

RELEASE VALVE FOR A COMPRESSED GAS CONTAINER

BACKGROUND OF THE INVENTION

Conventional stored gas systems for deploying the inflatable air bags for vehicle occupant crash protection utilize explosive devices to rupture a sealing plug for release of high pressure inflation gas from a pressure vessel. The most common method for actuating the explosive device is through an impact sensor closing an electrical circuit to a wire connected to the vehicle electric system and embedded in the explosive.

Although not disclosed in a vehicle air bag system environment, the basic components of an electrically operated release valve is disclosed in U.S. Pat. No. 2,515,068 issued to Carl T. Young on July 11, 1950 and entitled "Fuel Valve".

Such electrically operated systems suffer from the disadvantages of (1) high cost, (2) pre-installation handling problems with explosives, and (3) possible inadvertent actuation from strong radio frequency signals, especially in the vicinity of aircraft-radar installations.

It is an object of the present invention to provide a wholly mechanical system for opening a high pressure cylinder which system contains no explosive or electrical components. In addition, a higher degree of protection against inadvertent actuation is provided by blocking the outlet port of the valve assembly while the system is inactive.

SUMMARY OF THE INVENTION

The present invention embodies a valve body assembly which includes a perforating lever, a sealing plug, a locking pin and a valve body. The mechanism is actuated by means of a pull cable or equivalent linkage which is caused to move by the collapse of a structural member of the vehicle upon impact. Prior to its actuation, the perforating lever blocks the outlet port of the valve assembly. When a force is supplied to the perforating lever, the lever rotates about its attaching shaft and strikes the sealing plug with a sufficient force to fracture the plug, allowing the escape of the high pressure gas. The displacement of the perforating lever uncovers the outlet port allowing the gas to enter a passenger restraint device such as an inflatable bag. The purpose of the locking pin is to prevent the return of the perforating lever after the sealing plug has been opened. A brittle type material such as a high density sintered iron is used for the sealing plug to facilitate its fracture when impacted by the perforating lever.

DESCRIPTION OF THE DRAWINGS

Further features and advantages of the present invention will be explained in greater detail making reference to the description which now follows, reference being had to the drawings in which:

FIG. 1 is a view in part sectional illustrating the release valve on a pressure vessel with the mechanism in its inoperative position;

FIG. 2 is a reduced view in part similar to FIG. 1 illustrating the perforating lever of the release valve as it penetrates the frangible closure sealing the pressure vessel; and FIG. 3 is a reduced end elevation of the release valve of FIG. 1.

DETAILED DESCRIPTION OF THE INVENTION

The release valve, generally designated 10, embodying the present invention is adapted to be coupled or mounted on a compressed gas container or pressure cylinder, generally designated 11. The pressure cylinder 11 is of a type particularly adapted to contain a charge of compressed gas to be used to inflate a vehicle passenger restraint device, such as an air bag. The inflation of the air bag is intended to occur if the vehicle is involved in a high impact collision. The rapidly inflated air bag is positioned upon inflation for interposition between the vehicle occupant and interior structural members forming the vehicle compartment.

Only two details of the compressed gas container 11 are of importance to the present invention. First, the container must be provided with a discharge aperture 12 in a plug 13 which is shown as welded within the container 11. The discharge aperture 12 is sealed by a frangible closure or disc 14. The frangible closure 14 is a brittle-type material such as a high density sintered iron. Closure 14 is held in place by an apertured cap 15 threaded on the plug 13.

Second, the container 11 must be provided with a means for coupling the release valve 10 thereon. As illustrated, this comprises an externally threaded collar 16 adapted to receive a bell-mouth internally threaded end portion 17 of the housing 18 of the release valve 10. The bell-mouth end portion 17 of the housing 18 comprises the inlet portion of the release valve 10.

The release valve housing 18 has a discharge or outlet port 19 adapted to be coupled to the plumbing or hardware (not shown) to which a vehicle passenger restraint system, such as an inflatable air bag, is connected for inflation. In order to inflate the air bag, the compressed gas in the container 11 must be made available. This is accomplished through a perforating lever 21 which is journalled within a chamber 22 in the valve housing 18.

The perforating lever 21 is supported at its upper end on the shaft 23 journalled in the housing. At its lower end, the perforating lever 21 has a sharp striking head 24. Flat side 25 of the perforating lever 21 overlies the inner end 26 of the outlet port 19 and is pressed tightly thereagainst by a coil spring 27 carried on shaft 23.

The foregoing relationship of the perforating lever to the outlet port in which the perforating lever 21 blocks the outlet port 19 provides a degree of protection against inadvertent actuation of the valve assembly while the system is inactive.

A force transmitting means operative to swing the perforating lever 21 in a direction to impact and fracture the frangible closure 14 to permit discharge of the compressed gas from the container 11 into the housing chamber 22 comprises an actuating lever 28 and cable or link means 29.

The actuating lever 28 is connected to an end 31 of shaft 23 projecting externally of the valve housing 18. The cable or link means 29 comprises a clevis 32 coupled to a cable 33. The cable 33 is adapted to be coupled to a structural member (not shown) of a vehicle. The structural member would be one that would be subject to deformation upon impact of the vehicle.

In order to insure that the perforating lever 21, after having been operated to fracture the frangible disc 14, does not rebound and shut off the flow of compressed gas through the outlet port 19, a spring-loaded blocking means is provided to engage perforating lever 21 after displacement to hold the latter against return to its original position covering the outlet port. The spring-loaded blocking means comprises a pin 34 in a boss 35 in the valve housing 18. The pin is urged toward the perforating lever 21 by a spring 36. Upon the perforating lever 21 being displaced to the position shown in FIG. 2, the pin 34 under the influence of the spring 36 will be driven in behind the edge 37 of the perforating lever 21 to block any rebound of the latter to its inoperative position, the position shown in FIG. 1.

The operation of the release valve mechanism embodying the present invention is believed apparent from the detailed description of its construction.

It will be understood that the invention is not to be limited to the exact construction shown and described, but that various changes and modifications may be made without departing from the spirit and scope of the invention as defined in the appended claims.

What we claim is:

1. A release valve for a compressed gas container,
   the valve having a housing provided with an inlet portion adapted to be coupled to the container over a frangible closure sealing a container discharge aperture,
   an outlet port in the housing,
   a chamber within the housing in communication with the inlet portion and the outlet port,
   a perforating lever journalled within the chamber and in inoperative position blocking the outlet port,
   force transmitting means operative to swing the perforating lever in a direction to impact and fracture the frangible closure to permit discharge of the compressed gas from the container into the housing chamber,
   the displacement of the perforated lever uncovering the outlet port to permit discharge of the compressed gas from the release valve,
   and a spring-loaded blocking means engaging the perforating lever after displacement and holding the latter against return to its original position covering the outlet port.

2. A release valve according to claim 1, in which:
   the force transmitting means comprises and actuating lever and cable means,
   the cable means being adapted to couple the actuating lever to a structural member and to transmit any deformation movement of the latter under impact to the actuating lever.

3. A release valve according to claim 2 in which:
   the actuating lever is mounted externally on the housing and is coupled by a shaft to the perforating lever which is internally mounted in the housing chamber.

4. A release valve according to claim 3, in which:
   the spring-loaded blocking means comprises a pin journalled in the housing in abutting relation to a surface of the perforating lever,
   and spring means urging the pin into the path of return movement of the perforating lever after the latter has been displaced to perforate the frangible closure.

5. A release valve according to claim 1, in which:
   the actuating lever is mounted externally on the housing and is coupled by a shaft to the perforating lever which is internally mounted in the housing chamber.

6. A release valve according to claim 5, in which:
   the spring-loaded blocking means comprises a pin journalled in the housing in abutting relation to a surface of the perforating lever,
   and spring-means urging the pin into the path of return movement of the perforating lever after the latter has been displaced to perforate the frangible closure.

7. A release valve according to claim 1, in which:
   the spring-loaded blocking means comprises a pin journalled in the housing in abutting relation to a surface of the perforating lever,
   and spring means urging the pin into the path of return movement of the perforating lever after the latter has been displaced to perforate the frangible closure.

* * * * *